Feb. 1, 1966 R. K. McKECHNIE 3,233,127
ELECTRODE STRUCTURE FOR MAGNETOHYDRODYNAMIC DEVICE
Filed Sept. 28, 1961 2 Sheets-Sheet 1
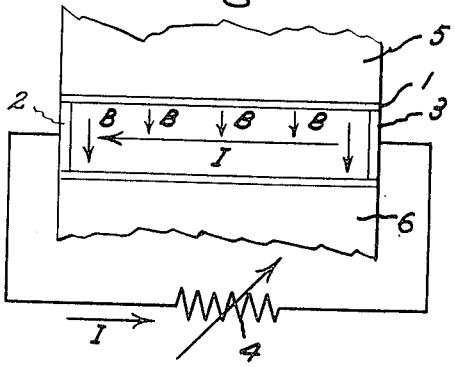
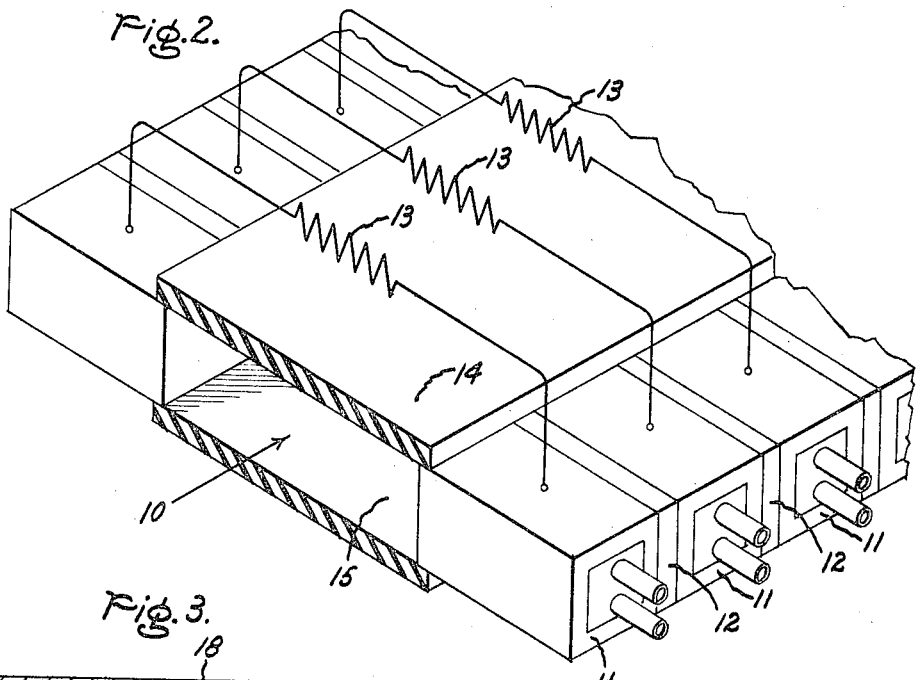
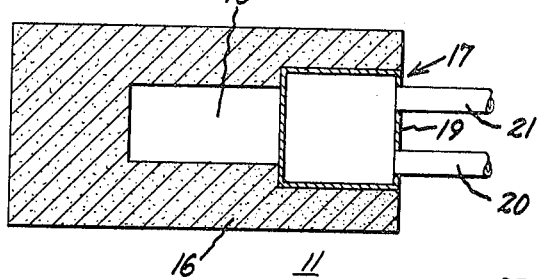
Inventor:
Robert K. McKechnie,
by Paul R. Webb, II
His Attorney.

Inventor:
Robert K. McKechnie,
by Paul R. Webb, II
His Attorney.

United States Patent Office 3,233,127
Patented Feb. 1, 1966

3,233,127
ELECTRODE STRUCTURE FOR MAGNETO-
HYDRODYNAMIC DEVICE
Robert K. McKechnie, Schenectady, N.Y., assignor to
General Electric Company, a corporation of New York
Filed Sept. 28, 1961, Ser. No. 141,526
8 Claims. (Cl. 310—11)

This invention relates to apparatus for generating electrical power, and more particularly, to an improved electrode structure for apparatus for generating direct current power by the interaction of a moving, conducting fluid and a magnetic field.

Conventional rotating devices for generating electricity are based on the principle of first converting heat energy to rotational mechanical energy, typically in a prime mover such as steam turbine, and then converting the mechanical energy into electrical energy by driving a metallic conductor through a magnetic field. For economical operation of such turbine-powered generating systems, high thermal conversion efficiencies in the steam turbine are imperative. The various improvements in turbine efficiencies that have been affected in the past have been achieved by operating at ever higher temperatures and pressures. As these rise, the problems they generate multiply so rapidly that a limit is quickly reached in what may be accomplished by further increases in operating temperatures and pressures. Probably the greatest difficulties arise in the materials area, since the mechanical stresses on moving parts such as turbine blades and shafts become progressively more severe as operating temperatures and pressures increase. Consequently a "diminishing returns" effect has set in and improvements in efficiency have been achieved in smaller and smaller increments and at higher and higher costs. Many of these difficulties can be avoided and radical improvements in conversion efficiencies can be affected by completely eliminating those elements which limit performance by devising a system that does not have any moving mechanical components.

To this end it has been proposed to generate electricity by abstracting energy from a moving conducting fluid, preferably a gaseous one, as it passes through a magnetic field. By using a fluid conductor in place of a solid one, the conductor may be driven through the magnetic field without employing rotating or moving parts merely by impressing a pressure difference on the fluid. Mechanical prime movers, such as turbines, are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid and a magnetic field will be magnetohydrodynamic generation or MHD generation.

A typical example of an MHD generating system as conceived by previous workers in the field is described in detail in Patent No. 1,717,413, issued June 18, 1929 to R. Rudenberg, which contemplates bringing a gas stream to a conducting condition by heating it to a temperature at which it becomes partially ionized. The ionized gas stream is driven through a magnetic field by a pressure difference, causing an electromotive force (E.M.F.) to be generated in the gas. Under the influence of this E.M.F. such charged particles as are present in the gas are deflected to a pair of electrodes causing a unidirectional current to flow through an external load circuit connected to the electrodes.

Other MHD generators have been proposed which use pairs of segmented electrodes; that is, the two electrodes are divided into segments insulated from each other and with individual loads connected between electrodes of each pair. Another generator, which utilizes the Hall effect to produce electric current, has the load connected between electrodes at opposite ends of the flow path with the electrodes of each intermediate pair shorted together. In all of these direct current MHD generators, it has been found that the current is concentrated at one edge of the electrode causing a "hot spot" which tends to destroy the electrode quickly. Therefore, it would be desirable to provide an improved electrode structure capable of more sustained operation.

It is an object of my invention to provide an electrode structure which does not substantially impede the flow of conducting gas.

It is another object of my invention to provide a cooled electrode structure for operation at optimum temperatures.

It is another object of my invention to provide an electrode structure composed of pyrolytic graphite without exposure of edge planes.

It is a further object of my invention to provide an electrode structure including a member coated with pyrolytic graphite.

In carrying out my invention in one form, at least a pair of electrodes are disposed on opposite sides of the flow path in a magnetohydrodynamic device and each electrode comprises a hollow member, a pyrolytic graphite surface on the member, the surface positioned adjacent the flow path, and the surface having its plane of deposition in parallel relationship to the flow path.

These and various other objects, features and advantages of the invention will be better understood from the following description taken in connection with the accompanying drawing in which:

FIGURE 1 is a diagrammatic cross-sectional view of a typical direct current MHD generator;

FIGURE 2 is a diagrammatic perspective view of another MHD generator embodying my invention;

FIGURE 3 is a sectional view of the electrode structure shown in FIGURE 2;

Figure 4:
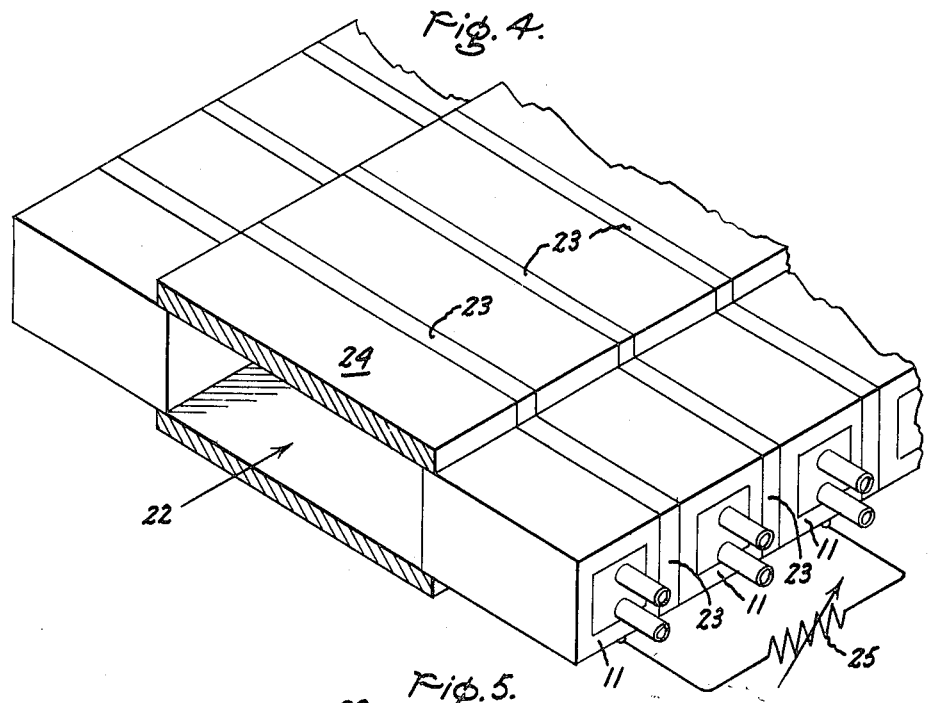
FIGURE 4 is a diagrammatic perspective view of another MHD generator embodying my invention.

Before discussing an MHD generator electrode constructed according to the principles of the invention, it will be useful to discuss some pertinent physical properties of gaseous fluids, the conditions under which they become conducting; and the manner in which this conductive condition may be achieved to facilitate interaction with a magnetic field. The basic properties of pure gases or of gas mixtures, such as air, are such that under normal circumstances of temperature and pressure the conductivity of the gas is so low that for all practical purposes the gas is non-conducting and no interaction with a magnetic field is possible. To achieve any significant results, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and rise to current conduction by interaction with a magnetic field.

The gas may be ionized in any one of several ways, as by thermal ionization, electric field ionization, X-ray ionization, arc discharge ionization, etc. Because of the relative ease and effectiveness with which it may be carried out, the preferred method in MHD generating systems is by thermal ionization; i.e., adding heat energy to the gas until some of the gas molecules lose electrons. The thermal ionization process is, however, severely temperature dependent, and is also a discontinuous phenomenon; i.e., there is a critical limiting threshold temperature below which no ionization takes place. The ionization energy, by which is meant the thermal energy increment which must be added to the molecules to initiate ionization and tear lose one or more of their electrons, is quite high for most gases. Common gases, such as air, CO, $CO_2$, as well as noble gases, show no perceptible ionization unless the gas is heated above a threshold temperature of approximately 3500° K. (6800° F.). It will be appreciated that the problems involved in heating the gas to an operating temperature, which must be even higher than the ionization threshold temperature of 3500° K., are substantial both in terms of the magnitude of the effort required to heat the gas and in terms of the problem of finding materials capable of withstanding such temperatures.

Fortunately, these difficulties may be greatly reduced by a technique which substantially lowers the critical threshold temperature for ionization. It has been found that by adding a small amount, in the range of 0.1–1% by volume, of some easily ionizable material such as an alkaline metal vapor, for example, the threshold ionization temperature is reduced by as much as 40–50%. For example, by "seeding" clean air through the addition of 1% or less by volume of potassium vapor, the critical ionization threshold temperature is reduced from approximately 3500° K. (6800° F.) to approximately 2000° K. (4100° F.). Cesium (Cs), potassium carbonate ($K_2CO_3$), cesium carbonate ($CsCO_3$) are additional examples of alkaline metal vapors or compounds which are effective for this purpose. For a more thorough discussion of electrical conductivity and ionization phenomena, reference is hereby made to the text "Introduction to the Theory of Ionized Gases" by J. L. Delcroix, Interscience Publishers, Inc., New York, N.Y., 1960.

The conducting gas after seeding is in suitable condition for expansion through a conventional expansion nozzle, after which it is caused to pass through a magnetic field of suitable configuration to establish a current within the conducting gas. The manner in which direct current is generated within the gaseous fluid may be most easily understood in connection with the diagrammatic illustrations of FIGURES 1–3 of the accompanying drawing.

In FIGURE 1, a conventional prior art D.C. MHD arrangement is shown as including an elongated rectangular fluid passage or duct 1, extending into the plane of the paper. Metallic electrodes 2 and 3 are disposed in the duct and are connected to a load circuit which, for simplicity of explanation and illustration, is shown as a simple variable resistance 4. The duct is disposed between the pole pieces 5 and 6 of a suitable magnet. If the direction of gas flow is into the plane of the paper and a magnetic field of constant flux density is applied at right angles to the direction of flow, as illustrated by the arrows labeled B, an E.M.F. is generated in the conducting gas at right angles both to the field and to the direction of flow. This E.M.F. acts on the free electrons in the ionized gas and causes an electron current to flow between electrodes 2 and 3 and through the load 4 in the direction shown by the arrow I. If the direction of gas flow is reversed, the current flow is in the opposite direction.

It is well known that a gaseous conducting medium flowing through a transverse magnetic field sets up an electric current in the direction of gas flow. Therefore, if electrodes are used which are long in the axial direction, they provide a return path for the current that is caused to flow in the axial direction. This phenomenon is known as the Hall effect, and the current which flows as a result thereof is known as the Hall current. In a direct current MHD generator of the general configuration of that shown in FIGURE 1, a Hall current will flow, and the current flowing between the two electrodes is reduced.

FIGURE 2 illustrates diagrammatically a direct current magnetohydrodynamic generator embodying my invention in which the Hall current is eliminated. In this case, a flow path or duct 10 has side walls which consist of a plurality of pairs of pyrolytic graphite electrodes 11, with the electrodes on each side being separated by an insulating material 12. The two electrodes 11 of each pair are directly opposite each other in the duct, and individual loads 13 are connected between the two electrodes of each pair. The top and bottom walls 14 and 15 of the duct are, of course, constructed of an insulating material. In this arrangement, because there is no continuous electrode to provide a return path for the Hall current, that current cannot flow. Therefore, the electric field which exists in the direction of gas flow F continues to exist and provides heating of the electrons in the gaseous working medium.

Pyrolytic graphite is defined as a material made from carbonaceous gases by thermal decomposition or from a carbonaceous material by evaporation and deposition on a surface. In pyrolytic graphite, planar graphite crystallites are arranged so that their layer structures are parallel to the deposition surface. Electrode 11 is formed, for example, by positioning a mandrel which corresponds to the interior configuration of the electrode within an enclosure and spaced therefrom to form a narrow passage therebetween. The passage atmosphere is reduced preferably to the lowest obtainable vacuum. A carbonaceous vapor is flowed through the passage at a temperature in the range of 2000° C. to 2500° C. whereby pyrolytic graphite is formed on the mandrel to produce the electrode. A carbonaceous material such as methane is heated to the above temperature range of 2000° C. to 2500° C. to decompose the material to a carbonaceous vapor. The material can also be supplied to the passage between the mandrel and the enclosure which mandrel and enclosure have been heated to the above temperature range to decompose the material.

At the above temperature it is possible to form 5 to 40 mils of pyrolytic graphite an hour to produce an electrode having a wall thickness of 100 to 200 mils without soot inclusions. After the desired thickness of the pyrolytic graphite electrode is attained, the gas flow is stopped and the apparatus is cooled to room temperature. The pressure is increased to atmospheric pressure and the mandrel with the electrode deposited thereon is removed from the enclosure. The electrode is then removed from the mandrel.

As is shown in FIGURE 3, electrode 11 comprises a hollow pyrolytic graphite member 16 having an open end 17 communicating with a chamber 18 therein. The planar graphite crystallites are arranged so that their layer structures are parallel to the deposition surface. Thus, the surface of member 16 adjacent the flow path has its plane of deposition in parallel relationship to the flow path. At open end 17 of member 16, a chamber 19 is positioned within chamber 18 to provide cooling for member 16 during operation of device 10. An inlet tube 20 and an outlet tube 21 are provided for chamber 19 to circulate an inert gas or water through chamber 19 to control the temperature of the surface of the member adjacent the flow path. It will be recognized that an inert gas can be circulated through chamber 18 to control the temperature of the surface of the member adjacent the flow path.

FIGURE 4 illustrates diagrammatically a direct current MHD generator in which the Hall current itself is utilized to supply an electric load. Such a device is disclosed in detail in patent application Serial No. 60,994, filed October 6, 1960 by Cobine and Harris, and assigned to the assignee of the present invention.

Briefly, such a generator utilizing the Hall effect comprises a flow passage or duct 22 provided with segmented pairs of electrodes 11 spaced along the direction of fluid flow and separated by insulating spacers 23. Each pair of electrodes 11 is electrically connected by a bar or strip of conducting material 24 to complete a current path for the transverse electric current generated by the flow of gaseous conducting fluid through the magnetic field B applied across the duct. The Hall current generated axially is utilized to supply an electric load 25 connected between axially displaced electrodes, which, in the device illustrated, are those farthest apart, although other pairs of electrodes may be utilized for the purpose.

Figure 5:
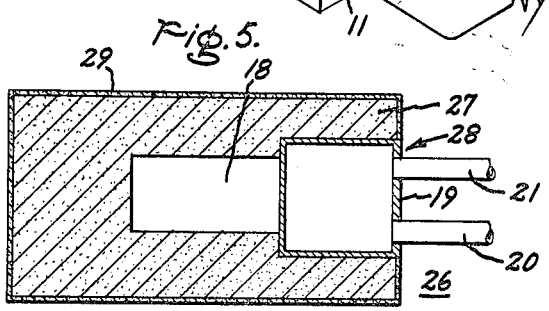
FIGURE 5 is a sectional view of a modified electrode structure.

FIGURE 5 illustrates a modified electrode 26 comprising a graphite member 27 with an open end 28 communicating with a chamber 18. A pyrolytic graphite coating 29 covers the exterior surfaces of member 27. The coated surface of electrode 26 which is placed adjacent the flow path, for example, in the device shown in FIGURE 2 or FIGURE 4 has its plane of deposition in parallel relationship to the flow path. At open end 28 of member 27 a chamber 19 is positioned within chamber 18 to provide cooling for member 27 during operation of electrode 26. An inlet tube 20 and an outlet tube 21 are provided for chamber 19 to circulate an inert gas or water through chamber 19 to control the temperature of the coated surface of the member adjacent the flow path. It will also be recognized that an inert gas can be circulated through chamber 18 to control the temperature of the coated surface adjacent the flow path.

Electrode 26 is formed, for example, by positioning member 27 within a chamber, flowing a carbonaceous vapor at a temperature in the range of 1450° C. to 2000° C. through the chamber, and maintaining the pressure within the chamber in the range of 0.2 centimeter of mercury to 70 centimeters of mercury. A pyrolytic graphite coating is deposited on the exterior surface of member 27 to form electrode 26. A carbonaceous material such as methane is heated to the above temperature range of 1450° C. to 2000° C. to decompose the material to a carbonaceous vapor. After the desired thickness of the pyrolytic graphite coating on the member is attained, the gas flow is stopped and the apparatus is cooled to room temperature. The pressure is increased to atmospheric pressure and the electrode is removed from the chamber. Under the above conditions coating thickness from 10 mils to 30 mils have been attained within the periods from two to six hours.

Figure 6:
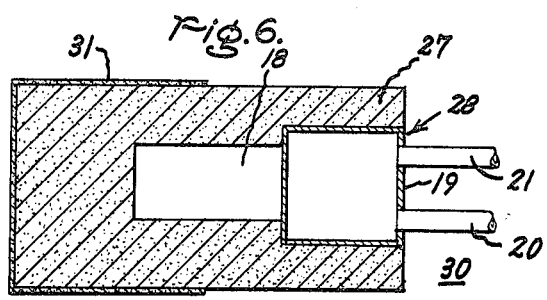
FIGURE 6 is a sectional view of a further modified electrode structure.

FIGURE 6 illustrates a further modified electrode 30 comprising a graphite member 27 with an open end 28 communicating with a chamber 18. A pyrotic graphite coating 31 covers a portion of the exterior surface of member 27. The coated surface of the electrode, which is placed adjacent the flow path, for example in the device shown in FIGURE 2 or FIGURE 4 of the drawing, has its plane of deposition in parallel relationship to the flow path. At open end 28 of member 27 a chamber 19 is positioned within chamber 18 to provide cooling for member 27 during operation of electrode 30. An inlet tube 20 and an outlet tube 21 are provided for chamber 19 to circulate an inert gas or water through chamber 19 to control the temperature of the coated surface adjacent the flow path. It will be recognized that an inert gas could be circulated through chamber 18 to control the temperature of the coated surface adjacent the flow path.

Electrode 30 is formed, for example, in the same manner as electrode 26 in FIGURE 5. However, the portion of member 27 which it is not desired to coat can be covered during the deposition process. Subsequently such covering is removed to expose the uncoated portion of member 27. The electrodes which are shown in FIGURES 5 and 6 can be substituted for electrode 11 in FIGURES 2 and 4.

While other modifications of this invention and variations thereof which may be employed within the scope of the invention have not been described, the invention is intended to include such that may be embraced within the following claims.

What I claim as new and desire to secure by Letters Patent of the United States is:

1. In a magnetohydrodynamic device having a flow path for a conductive fluid and a magnetic field extending transversely across the flow path, the combination comprising at least a pair of electrodes disposed on opposite sides of said flow path and each electrode comprising a hollow member, a pyrolytic graphite surface on said member, said surface positioned adjacent said flow path, and said surface having its plane of deposition in parallel relationship to said flow path.

2. In a magnetohydrodynamic device having a flow path for a conductive fluid and a magnetic field extending transversely across the flow path, the combination comprising at least a pair of electrodes disposed on opposite sides of said flow path and each electrode comprising a hollow graphite member, a pyrolytic graphite coating on a portion of the exterior surface of said member, and the coated surface adjacent said flow path having its plane of deposition in parallel relationship to said flow path.

3. In a magnetohydrodynamic device having a flow path for a conductive fluid and a magnetic field extending transversely across the flow path, the combination comprising at least a pair of electrodes disposed on opposite sides of said flow path and each electrode comprising a hollow graphite member, a pyrolytic graphite coating on the exterior surface of said member, and the coated surface adjacent said flow path having its plane of deposition in parallel relationship to said flow path.

4. In a magnetohydrodynamic device having a flow path for a conductive fluid and a magnetic field extending transversely across the flow path, the combination comprising at least a pair of electrodes disposed on opposite sides of said flow path and each electrode comprising a hollow pyrolytic graphite member, and the surface of said member adjacent said flow path having its plane of deposition in parallel relationship to said flow path.

5. In a magnetohydrodynamic device having a flow path for a conductive fluid and a magnetic field extending transversely across the flow path, the combination comprising at least a pair of electrodes disposed on opposite sides of said flow path and each electrode comprising a hollow member, a pyrolytic graphite surface on said member, said surface positioned adjacent said flow path, said surface having its plane of deposition in parallel relationship to said flow path, and means to control the temperature of said pyrolytic graphite surface.

6. In a magnetohydrodynamic device having a flow path for a conductive fluid and a magnetic field extending transversely across the flow path, the combination comprising at least a pair of electrodes disposed on opposite sides of said flow path and each electrode comprising a hollow graphite member, a pyrolytic graphite coating on a portion of the exterior surface of said member, the coated surface adjacent said flow path having its plane of deposition in parallel relationship to said flow path, and means to control the temperature of the coated surface adjacent the flow path.

7. In a magnetohydrodynamic device having a flow path for a conductive fluid and a magnetic field extending transversely across the flow path, the combination comprising at least a pair of electrodes disposed on opposite sides of said flow path and each electrode comprising a hollow graphite member, a pyrolytic graphite coating on the exterior surface of said member, the coated surface adjacent said flow path having its plane of deposition in parallel relationship to said flow path, and means to control the temperature of said coated surface adjacent the flow path.

8. In a magnetohydrodynamic device having a flow path for a conductive fluid and a magnetic field extending transversely across the flow path, the combination comprising at least a pair of electrodes disposed on opposite sides of said flow path and each electrode comprising a hollow pyrolytic graphite member, the surface of said member adjacent said flow path having its plane of deposition in parallel relationship to said flow path, and means to control the temperature of said surface adjacent the flow path.

References Cited by the Examiner
UNITED STATES PATENTS

| | | | |
|---|---|---|---|
| 1,717,413 | 6/1929 | Rudenberg | 310—11 |
| 2,883,708 | 4/1959 | Sem | 204—294 X |
| 2,900,319 | 8/1959 | Ferrand | 204—294 X |
| 2,960,614 | 11/1960 | Mallinckrodt | 310—11 |

ORIS L. RADER, *Primary Examiner.*

MILTON O. HIRSHFIELD, *Examiner.*

J. A. HINKLE, D. X. SLINEY, *Assistant Examiners.*